(12) United States Patent
Nakayama et al.

(10) Patent No.: US 10,195,561 B2
(45) Date of Patent: Feb. 5, 2019

(54) STEAM SUPPLY SYSTEM AND $CO_2$ RECOVERY UNIT INCLUDING THE SAME

(71) Applicant: MITSUBISHI HEAVY INDUSTRIES, LTD., Tokyo (JP)

(72) Inventors: Koji Nakayama, New York, NY (US); Takahito Yonekawa, New York, NY (US); Masayuki Inui, New York, NY (US); Tatsuya Tsujiuchi, New York, NY (US); Osamu Miyamoto, Hiroshima (JP); Yoshiki Sorimachi, Tokyo (JP)

(73) Assignee: MITSUBISHI HEAVY INDUSTRIES ENGINEERING, LTD., Yokohama-shi (JP)

( * ) Notice: Subject to any disclaimer, the term of this patent is extended or adjusted under 35 U.S.C. 154(b) by 870 days.

(21) Appl. No.: 13/623,491

(22) Filed: Sep. 20, 2012

(65) Prior Publication Data

US 2014/0076708 A1    Mar. 20, 2014

(51) Int. Cl.
*B01D 53/14* (2006.01)
*B01D 53/62* (2006.01)
(Continued)

(52) U.S. Cl.
CPC ..... *B01D 53/1425* (2013.01); *B01D 53/1412* (2013.01); *B01D 53/1475* (2013.01);
(Continued)

(58) Field of Classification Search
CPC ............ B01D 53/1412; B01D 53/1425; B01D 53/1475; B01D 53/343; B01D 53/346;
(Continued)

(56) References Cited

U.S. PATENT DOCUMENTS 3,489,506 A * 1/1970 Galstaun et al. ............. 423/233
3,572,588 A * 3/1971 Hamilton, Jr. ..... B01D 19/0068
237/9 R
(Continued)

FOREIGN PATENT DOCUMENTS

JP    61-11590 A    1/1986
JP    63-23557 U    2/1988
(Continued)

OTHER PUBLICATIONS

International Search Report of PCT/JP2013/075198 dated Dec. 24, 2013, w/English translation, (3 pages).
(Continued)

*Primary Examiner* — Jonathan Miller
*Assistant Examiner* — Jonathan Luke Pilcher
(74) *Attorney, Agent, or Firm* — Westerman, Hattori, Daniels & Adrian

(57) ABSTRACT

A steam supply system that can reheat $CO_2$ absorbing liquid without lowering performance of a reboiler by decompressing a condensed water drum is provided. This system includes a reboiler that raises the temperature of absorbing liquid contacted with exhaust gas discharged from a boiler to absorb $CO_2$ in the exhaust gas and heated to eliminate $CO_2$. The reboiler includes a heat exchanger tube to which steam for heating is supplied and a condensed water drum that recovers condensed water of the steam introduced from the heat exchanger tube as steam drain, and the condensed water drum is provided with decompression unit that lowers pressure in the condensed water drum.

4 Claims, 4 Drawing Sheets

(51) Int. Cl.
*B01D 53/78* (2006.01)
*F23J 15/02* (2006.01)
*F22B 37/00* (2006.01)
*B01D 3/32* (2006.01)

(52) U.S. Cl.
CPC ............ *B01D 53/62* (2013.01); *B01D 53/78* (2013.01); *F22B 37/008* (2013.01); *F23J 15/02* (2013.01); *B01D 3/322* (2013.01); *B01D 2252/204* (2013.01); *B01D 2252/20478* (2013.01); *B01D 2257/504* (2013.01); *B01D 2258/0283* (2013.01); *F23J 2215/50* (2013.01); *F23J 2219/40* (2013.01); *Y02A 50/2342* (2018.01); *Y02C 10/04* (2013.01); *Y02C 10/06* (2013.01); *Y02E 20/326* (2013.01)

(58) Field of Classification Search
CPC .......... B01D 2257/504; B01D 2259/65; B01D 2259/652; B01D 3/322; F23J 2215/50; F23J 15/06; F01K 9/003; F28B 9/06; F28B 9/08; F28B 9/10; F28B 11/00; F28B 2001/065
USPC ..................... 96/242, 234; 202/235; 165/112
See application file for complete search history.

(56) References Cited

U.S. PATENT DOCUMENTS

| | | | |
|---|---|---|---|
| 3,935,902 A * | 2/1976 | Heller ..................... | F01K 9/003 165/110 |
| 4,160,810 A * | 7/1979 | Benson et al. ................ | 423/220 |
| 5,145,658 A * | 9/1992 | Chao .............................. | 423/232 |
| 2006/0204425 A1* | 9/2006 | Kamijo et al. ............. | 423/437.1 |
| 2007/0283813 A1* | 12/2007 | Iijima et al. ..................... | 96/235 |
| 2010/0005722 A1* | 1/2010 | Iijima et al. ..................... | 48/128 |
| 2010/0050637 A1 | 3/2010 | Yamashita et al. | |
| 2010/0229723 A1* | 9/2010 | Gelowitz et al. ............... | 95/162 |
| 2011/0107916 A1* | 5/2011 | Inoue et al. .................... | 96/242 |
| 2011/0120128 A1* | 5/2011 | Handagama et al. .......... | 60/649 |
| 2011/0167823 A1* | 7/2011 | Berger .................... | F01K 9/003 60/645 |
| 2012/0101767 A1* | 4/2012 | Ohashi et al. ................ | 702/130 |
| 2012/0234177 A1* | 9/2012 | Yonekawa ....................... | 96/242 |
| 2012/0240579 A1* | 9/2012 | Hirata et al. ..................... | 60/653 |
| 2014/0041523 A1* | 2/2014 | Tsujiuchi et al. ............... | 96/218 |

FOREIGN PATENT DOCUMENTS

| | | |
|---|---|---|
| JP | 05-184866 A | 7/1993 |
| JP | 2007-139221 A | 6/2007 |
| JP | 2010-88982 A | 4/2010 |
| JP | 2010-216695 A | 9/2010 |
| JP | 2010-253370 A | 11/2010 |
| JP | 2011-136294 A | 7/2011 |
| JP | 2011-218287 A | 11/2011 |
| JP | 2011-240321 A | 12/2011 |
| JP | 2012-538 A | 1/2012 |
| JP | 2012-87032 A | 5/2012 |

OTHER PUBLICATIONS

Written Opinion of PCT/JP2013/075198, dated Dec. 24, 2013, w/English tranlsation, (8 pages).
Decision to Grant a Patent dated Feb. 2, 2016, issued in Japanese Patent Application No. 2014-536887. Explanation of Relevance: "The Decision to Grant a Patent has been received." (3 pages).
Extended (supplementary) European Search Report dated May 3, 2016, issued in European Patent Application No. 13838237.9. (8 pages).
Notice of Acceptance dated Jun. 22, 2016, issued in counterpart Australian Patent Application No. 2013319046, (2 pages). Concise Explanation of the Relevance: The Notice of Acceptance has been received.
Notice of Allowance dated Jan. 3, 2017, issued in counterpart Canadian Patent Application No. 2884790. (1 page).

* cited by examiner

STEAM SUPPLY SYSTEM AND $CO_2$ RECOVERY UNIT INCLUDING THE SAME

TECHNICAL FIELD

The present invention relates to a steam supply system which is preferably used in $CO_2$ recovery unit in exhaust gas discharged from an industrial facility, for example, and the $CO_2$ recovery unit including the same.

BACKGROUND ART

From industrial facilities such as thermal power generation equipment, a large amount of carbon dioxide (hereinafter, referred to as $CO_2$) is discharged due to combustion of fossil fuel such as coal and fuel oil. Emission limitation of $CO_2$ has been considered from the viewpoint of prevention of global warming, and as one measure, there has been the $CO_2$ separation and recovery technology.

For industrial facilities such as a thermal power plant that uses a large amount of fossil fuel, a method of eliminating and recovering $CO_2$ in combustion exhaust gas by contacting combustion exhaust gas of a boiler with amine based $CO_2$ absorbing liquid, for example, and a method of storing the recovered $CO_2$ without discharging it to the ambient air have been known.

Moreover, as a step of eliminating and recovering $CO_2$ from combustion exhaust gas using the $CO_2$ absorbing liquid as described above, a step of contacting the combustion exhaust gas with the $CO_2$ absorbing liquid in an absorbing tower and a step of heating the absorbing liquid that absorbed $CO_2$ in a regeneration tower to release $CO_2$ as well as regenerate the absorbing liquid for circulation to the absorbing tower to be reused have been adopted.

Patent Literature 1 discloses that, in a regeneration tower, MEA (monoethanolamine) solution is regenerated due to heating by a regenerative heater (reboiler) and cooled by a heat exchanger to be returned to a $CO_2$ elimination tower.

CITATION LIST

Patent Literature

PTL 1

Japanese Unexamined Patent Application, Publication No. 5-184866

SUMMARY OF INVENTION

Technical Problem

However, in a reboiler provided in such $CO_2$ recovery apparatus, since the pressure difference between the reboiler and a condensed water drum is small, condensed water in a heat exchanger tube provided in the reboiler is difficult to flow to the condensed water drum, whereby performance of the reboiler and the liquid level of the condensed water drum become unstable, which has been problematic.

FIG. 5 shows a schematic configuration showing a reference example of a steam supply system. Absorbing liquid (not shown) of a regeneration tower (not shown) is reheated by a circulation route $L_4$ that circulates the absorbing liquid to the outside of the tower and steam to be provided to a heat exchanger tube 130a of a reboiler 130 provided to a tower bottom portion of the regeneration tower. To the reboiler 130, the steam supply tube 2 is connected, and steam is supplied to the heat exchanger tube 130a in the reboiler. The steam that applied heat to the absorbing liquid by the heat exchanger tube 130a is sent to the condensed water drum 5 and subjected to gas-liquid separation in the condensed water drum. Moreover, condensed water 6 flows from the bottom of the condensed water drum 5 through a drain extraction tube 7, and delivered by a pump 8 via a steam drain tube 9.

In the steam supply system shown in FIG. 5, differential pressure between the condensed water drum and the heat exchanger tube provided in the reboiler is small. This causes a problem that the condensed water in the heat exchanger tube provided in the reboiler is difficult to flow to the condensed water drum, whereby performance of the reboiler and the liquid level of the condensed water drum become unstable.

In addition, since performance of the reboiler is lowered, there has been a problem that efficiency of discharging $CO_2$ from the $CO_2$ absorbing liquid that absorbed $CO_2$ in the regeneration tower to regenerate the $CO_2$ absorbing liquid is lowered.

The present invention is made considering such circumstances, and an object of the present invention is to provide a steam supply system that reheats $CO_2$ absorbing liquid without lowering performance of the reboiler by appropriately controlling the inner pressure of the condensed water drum.

Solution to Problem

In order to solve the above problem, a steam supply system and $CO_2$ recovery unit including the same according to the present invention apply the following means.

A steam supply system according to the present invention comprises: a reboiler that raises a temperature of absorbing liquid contacted with exhaust gas discharged from a boiler to absorb $CO_2$ in the exhaust gas and heated to eliminate $CO_2$, the reboiler including: a heat exchanger tube to which steam for heating is supplied; and a condensed water drum that recovers condensed water of the steam introduced from the heat exchanger tube as steam drain, wherein the condensed water drum is provided with decompression unit that lowers pressure in the condensed water drum.

For example, even when the pressure of the condensed water drum is raised to be close to the pressure of the heat exchanger tube of the reboiler, decompression unit that lowers the pressure in the condensed water drum is provided. By this decompression unit, the pressure difference occurs between the reboiler and the condensed water drum, and the condensed water easily flows from the reboiler on the high-pressure side to the condensed water drum on the low-pressure side. This makes performance of the reboiler and the liquid level of the condensed water drum stable. Since the performance of the reboiler is stable, heat can be stably applied to the $CO_2$ absorbing liquid circulating in the regeneration tower. This ensures separation of $CO_2$ in the $CO_2$ absorbing liquid.

Further, in the steam supply system according to the present invention, the decompression unit is cooling unit that cools condensed water in the condensed water drum.

Cooling unit that cools the condensed water in the condensed water drum is provided. In this cooling unit, for example, a part of the condensed water extracted from the condensed water drum is cooled and returned to the condensed water drum again. By doing this, the temperature of the condensed water drum is lowered and the pressure in the condensed water drum can be lowered.

Further, in the steam supply system according the present invention, the cooling unit includes: a drain circulation route branched from a steam drain piping that discharges the steam drain from the condensed water drum, the drain circulation route returning the steam drain to the condensed water drum; and a cooler that cools the steam drain branched to the drain circulation route side.

Steam drain flows in the drain circulation route branched from the steam drain piping that discharges the steam drain from the condensed water drum and passes through the cooler to be returned to the condensed water drum. By returning the steam drain cooled by the cooler to the condensed water drum, saturation temperature and saturation pressure can be lowered. This lowers the pressure in the condensed water drum.

Further, in the steam supply system according to the present invention, the cooling unit includes: a cooler provided on a steam drain piping that discharges the steam drain from the condensed water drum; and a steam drain circulation route branched from the downstream side of the cooler, the steam drain circulation route returning the steam drain to the condensed water drum.

A steam drain circulation route branched from the downstream side of the cooler is provided to return the steam drain to the condensed water drum. By doing this, providing the cooler to the branched circulation route is unnecessary.

Further, in the steam supply system according to the present invention, the cooling unit includes a cooler provided on a reboiler exit piping that connects the reboiler and the condensed water drum.

As cooling unit, a cooler provided on a reboiler exit piping that connects the reboiler and the condensed water drum is provided. This lowers the temperature of steam drain to be recovered by the condensed water drum. Since the steam drain cooled by the cooler is supplied to the condensed water drum, saturation temperature and saturation pressure can be lowered by cooling the condensed water drum. Accordingly, the inner pressure of the condensed water drum can be lowered.

Further, in the steam supply system according to the present invention, the decompression unit includes a vent tube that discharges gas phase in the condensed water drum.

By providing a vent tube with the condensed water drum, when the inner pressure of the condensed water drum becomes a predetermined value or more for example, the vent tube can be opened to discharge gas phase of the condensed water drum to lower the inner pressure.

Further, the steam supply system according to the present invention includes: a pressure measuring portion that obtains a pressure difference between an inner pressure of the condensed water drum and a steam pressure to be supplied to the reboiler; and control unit that controls the decompression unit so as to adjust the pressure difference obtained in the pressure measuring portion to a desired value.

A signal is transmitted from the pressure measuring portion to obtain the pressure difference between the inner pressure of the condensed water drum and the steam pressure to be supplied to the reboiler to the control unit that controls the decompression unit. The control unit that received the signal can regulate the flow rate of a cooling medium flowing in the cooler since the degree of opening of the control unit is determined from the pressure difference between the steam pressure to be supplied to the reboiler and the inner pressure of the condensed water drum.

Further, $CO_2$ recovery unit according to the present invention includes: an absorbing tower that contacts $CO_2$ in exhaust gas with the absorbing liquid to absorb $CO_2$; and a regeneration tower that discharges $CO_2$ absorbed in the absorbing tower from the absorbing liquid, wherein the regeneration tower includes a reboiler having the steam supply system described above.

Since performance of the reboiler is made stable due to the steam supply system, heat can be stably applied to the $CO_2$ absorbing liquid circulating in the regeneration tower. This ensures separation of $CO_2$ in the $CO_2$ absorbing liquid, so that stable $CO_2$ recovery can be achieved.

Advantageous Effects of Invention

According to the steam supply system and the $CO_2$ recovery unit including the same according to the present invention, a decompression unit that lowers the pressure of the condensed water drum to provide the pressure difference between the pressure in the heat exchanger tube of the reboiler and the inner pressure of the condensed water drum provided in the $CO_2$ recovery unit is provided. By doing this, the condensed water generated in the heat exchanger tube stably flows to the condensed water drum to prevent the condensed water from retaining in the heat exchanger tube. Accordingly, the reboiler can be operated stably, so that $CO_2$ absorbing liquid circulating in the regeneration tower can be surely reheated.

DESCRIPTION OF EMBODIMENTS

Hereinafter, embodiments of a steam supply system and $CO_2$ recovery unit including the same according to the present invention will be explained with reference to the drawings.

First Embodiment

Hereinafter, a first embodiment of the present invention will be explained.

Figure 6:
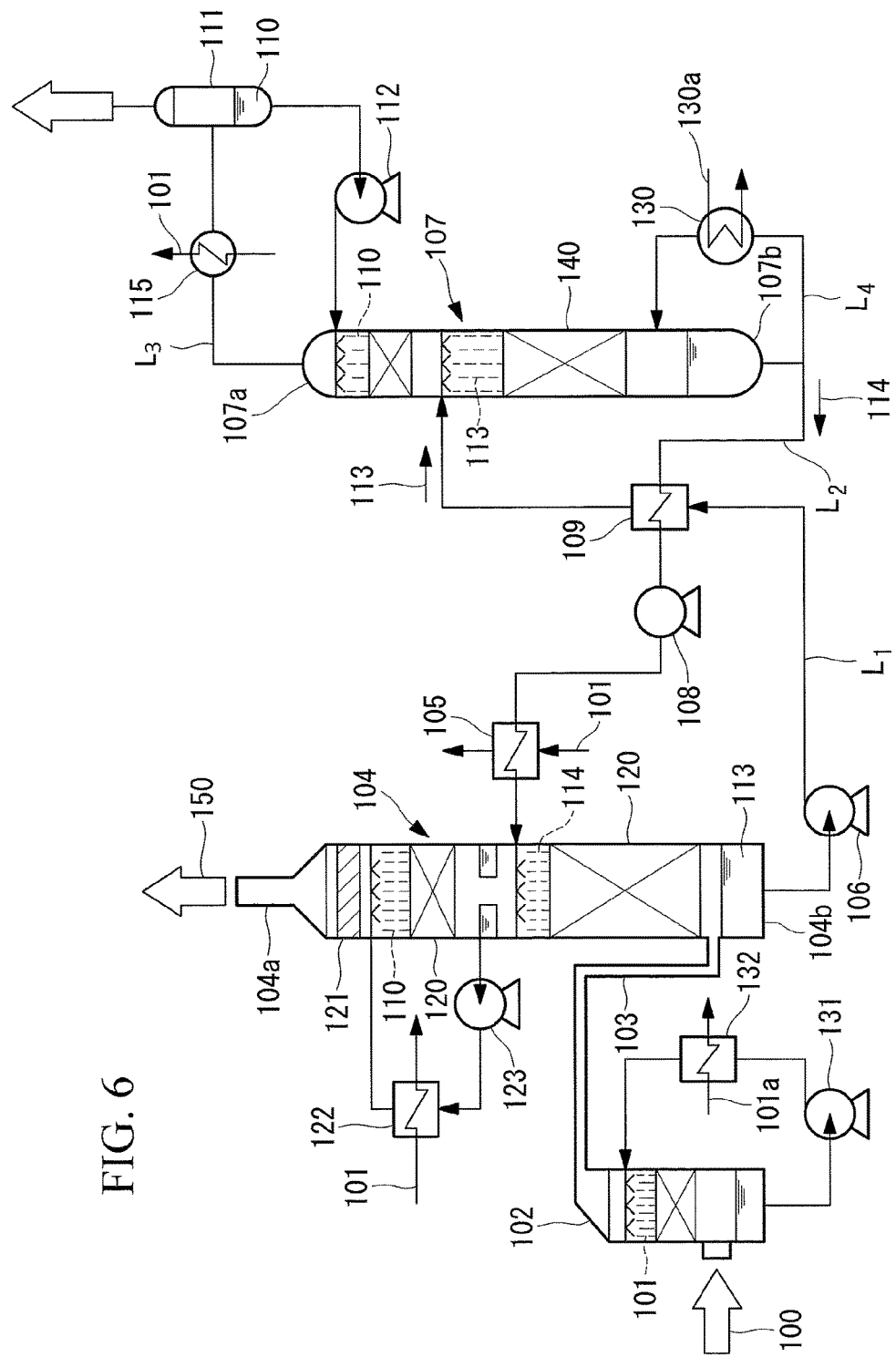
FIG. 6 is a schematic configuration diagram of a $CO_2$ recovery apparatus to which the steam supply system according to the present invention is applied.

FIG. 6 shows a basic configuration of a $CO_2$ recovery apparatus according to this embodiment.

As shown in FIG. 6, in the $CO_2$ recovery apparatus, exhaust gas 100 including $CO_2$ discharged from an industrial facility such as a boiler and a gas turbine is supplied to a cooling tower 102 by a not shown blower. The exhaust gas 100 supplied to the cooling tower 102 is cooled by cooling water 101. The cooling water 101 used to cool the exhaust gas 100, by a pump 131, passes through a cooler 132 to be supplied to the cooling tower 102 again, and is sprayed in the tower. Additionally, in the cooler 132, cooling water 101a that cools the cooling water 101 to be supplied to the cooling tower 102 is used.

The exhaust gas 100 including the cooled $CO_2$ is supplied from a lower portion of an absorbing tower 104 via an exhaust gas line 103. The absorbing liquid 113 is supplied from an upper portion of the absorbing tower 104 and sprayed to the lower portion. In the absorbing tower 104, for example, alkanolamine-based $CO_2$ absorbing liquid 113 (amine solution) is countercurrently contacted with the exhaust gas 100 while passing a packing 120. Because of this, $CO_2$ in the exhaust gas 100 is absorbed in the $CO_2$ absorbing liquid 113, and $CO_2$ is eliminated from the exhaust gas 100 discharged from the industrial facility. From a tower top portion 104a of the absorbing tower 104, cleaned gas 150 in which $CO_2$ is eliminated is discharged.

The absorbing liquid 113 produces heat and raises its temperature by absorbing $CO_2$, so that the cleaned gas 150 can include water vapor etc. The water vapor in the cleaned gas 150 is condensed by being cooled through countercurrent contact with cooled water on the packing layer 120 at the upper portion of the absorbing tower 104. A mist eliminator 121 is placed above the packing layer 120 to capture mist in the cleaned gas 150. On the outside of the absorbing tower 104, a cooler 122 and a pump 123 that circulates a part of the condensed water between the cooler 122 and the absorbing tower 104 are placed.

The absorbing liquid 113 that absorbed $CO_2$ in the absorbing tower 104 is retained in a tower bottom portion 104b, and supplied by a pump 106 from a liquid sending line $L_1$ that connects the tower bottom portion 104b of the absorbing tower 104 and an upper portion of a regeneration tower 107 to the regeneration tower 107 to be sprayed to a packing 140. On an intersection of the liquid sending line $L_1$ and a liquid sending line $L_2$, a heat exchanger 109 that executes heat exchange between rich solution 113 (absorbing liquid that absorbed $CO_2$) and lean solution 114 (absorbing liquid in which $CO_2$ is eliminated) is placed. In the heat exchanger 109, the rich solution 113 is heated and the lean solution 114 is cooled.

In the $CO_2$ absorbing liquid 113 that absorbed $CO_2$ (rich solution), $CO_2$ is discharged due to endothermic reaction by countercurrent contact during passage through the packing 140 in the regeneration tower 107. Most $CO_2$ is eliminated until the $CO_2$ absorbing liquid reaches a tower bottom portion 107b of the regeneration tower 107, and the $CO_2$ absorbing liquid is regenerated as lean solution 114. The regenerated lean solution 114 is supplied to the absorbing tower 104 again by a pump 108 via a lean solution cooling apparatus 105 as $CO_2$ absorbing liquid (anime solution), and reused.

The lean solution 114 which is regenerated by discharging $CO_2$ in the regeneration tower 107 is refluxed to the absorbing tower 104 by the pump 108 through the liquid sending line $L_2$ that connects the tower bottom portion 107b of the regeneration tower 107 and the upper portion of the absorbing tower 104, and during that, in the heat exchanger 109, it is subjected to heat exchange with the absorbing liquid 113 to be supplied from the absorbing tower 104 to the regeneration tower 107 to be cooled, and further, fully cooled to the temperature which is suitable for absorbing $CO_2$ by the water-cooling type cooler 105.

The reference symbol $L_3$ denotes a $CO_2$ discharge line connected to the tower top portion 107a of the regeneration tower 107. $CO_2$ discharged from the $CO_2$ absorbing liquid 113 in the regeneration tower 107 by the line $L_3$ is fully cooled via a cooler 115 using cooling water 101 to be sent to a gas-liquid separator 111. The $CO_2$ sent to the gas-liquid separator 111 is separated from condensed water 110 which is accompanied after the elimination of $CO_2$. The separated $CO_2$ is sent to a not shown $CO_2$ compression apparatus. After that, the recovered carbon dioxide ($CO_2$) is compressed by the $CO_2$ compression apparatus to obtain high-pressure $CO_2$. The condensed water 110 separated in the gas-liquid separator 111 is refluxed to the upper portion of the regeneration tower 107 by a pump 112.

The refluxed condensed water 110 cools a packing 140 to prevent discharge of an absorbing agent etc.

The absorbing liquid 113 including $CO_2$ in the absorbing tower 104 is supplied to the upper portion of the regeneration tower 107, passes through the packing 140 to be retained in the tower bottom portion 107b. A reboiler 130 is provided to the tower bottom portion 107b of the regeneration tower 107. Moreover, a circulation route $L_4$ that circulates the absorbing liquid 113 to the outside of the tower and a heat exchanger tube 130a that heats the absorbing liquid 113 are provided. A part of the absorbing liquid 113 of the tower bottom portion 107b is supplied to the reboiler 130 through the circulation route $L_4$, and refluxed in the tower after it is heated due to heat exchange with high-temperature steam. Due to this heating, $CO_2$ is discharged from the absorbing liquid 113 in the tower bottom portion 107b, and $CO_2$ is also discharged from the absorbing liquid 113 during gas-liquid contact on the packing 140 which is indirectly heated.

Figure 1:
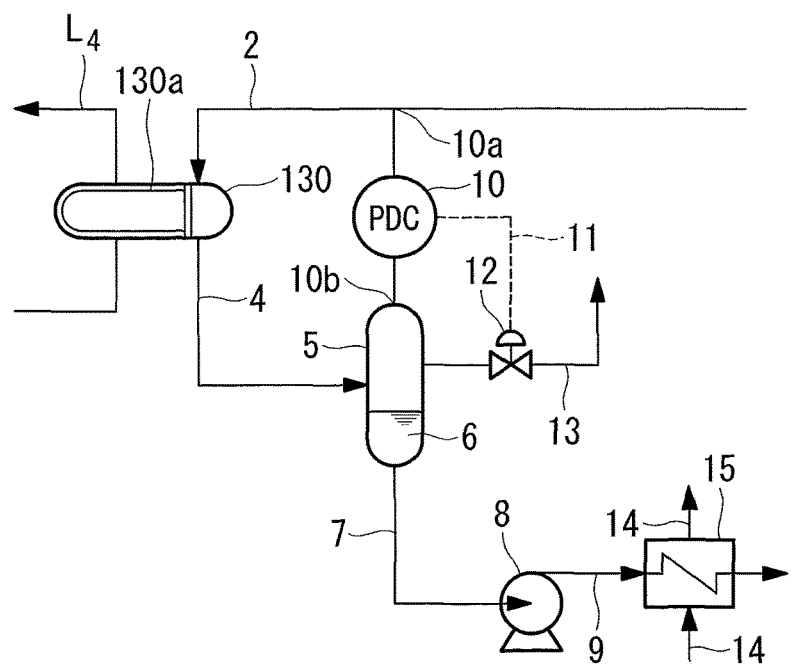
FIG. 1 is a schematic configuration diagram showing a steam supply system regarding a first embodiment according to the present invention.

FIG. 1 shows a configuration of a part surrounding the reboiler 130 provided to the tower bottom portion 107b of the regeneration tower 107 shown in FIG. 6. In the reboiler 130, a number of heat exchanger tubes 130a connected to a steam supply tube 2 are placed to contact with absorbing liquid flowing in the circulation route $L_4$. Each heat exchanger tube 130a is connected to a steam discharge tube 4 connected to a condensed water drum 5.

To the condensed water drum 5, a measuring portion 10b for pressure measuring is provided. Moreover, to the steam supply tube 2, a measuring portion 10a for pressure measuring is provided. Based on the pressure obtained from these measuring portions 10a, 10b, the pressure difference can be obtained at a control portion 10. Further, to the condensed water drum 5, a vent tube 13 (decompression unit) is placed, and the vent tube 13 includes a control valve 12 that regulates the flow rate of the vent tube 13. Via this vent tube 13, gas phase (steam) in the condensed water drum 5 is discharged to the outside (for example, the ambient air).

To the bottom portion of the condensed water drum 5, a steam drain extraction tube 7 is connected, which is connected to an intake portion of the pump 8.

A discharge portion of the pump 8 is connected to a steam drain tube 9, and a heater 15 is provided to the steam drain tube 9. In the heater 15, a plurality of heat exchanger tubes are placed to contact with steam drain introduced from the steam drain tube 9. As a heating medium 14 flowing in the heat exchanger tube, for example, the lean solution 114 (see FIG. 6) which is regenerated by discharging $CO_2$ is used.

Next, an operation of the steam supply system having the above configuration will be explained.

A part of the absorbing liquid 113 of the tower bottom portion 107b is supplied to the reboiler 130 through the circulation route $L_4$, and heated due to heat exchange with the heat exchanger tube 130a in which steam supplied from the steam supply tube 2 flows to be refluxed to the regeneration tower 107.

The steam after heat exchange is supplied to the condensed water drum 5 and subjected to gas-liquid separation in the condensed water drum 5.

By the measuring portion 10b of the control portion 10 provided in the condensed water drum 5, the inner pressure of the condensed water drum 5 is measured. The control portion 10 is controlled such that the measuring portions 10a and 10b that measure in-tube pressure of the steam supply tube 2 provide the pressure difference. The control portion 10 transmits a signal 11 to the control valve 12 provided on the vent tube 13 when the pressure in the measuring portion 10b is raised so that the pressure difference between the measuring portions 10a and 10b exceeds a predetermined value to be close to pressure equalization. In the control valve 12 that received the signal 11, the degree of opening of the control valve 12 is determined based on the pressure difference.

The condensed water 6 subjected to gas-liquid separation by the condensed water drum 5 is supplied to the pump 8 via the steam drain extraction tube 7. The condensed water 6 supplied to the pump 8 is sent passing through the steam drain tube 9. Moreover, the condensed water 6 is indirectly heated by a heating medium 14 (for example, lean solution) flowing in the heat exchanger tube penetrating through the heater 15 provided on the steam drain tube 9.

According to this embodiment, the following operation and effect are provided.

In a case where the pressure in the condensed water drum 5 is raised to be close to pressure equalization with the pressure of the heat exchanger tube 130a of the reboiler 130, the vent tube 13 is provided as decompression unit that lowers the pressure of the condensed water drum 5. By the vent tube 13, the pressure difference is generated between the reboiler 130 and the condensed water drum 5, and the condensed water 6 easily flows from the reboiler 130 on the high-pressure side to the condensed water drum 5 on the low-pressure side. This makes performance of the reboiler 130 and the liquid level of the condensed water drum 5 stable.

Since the performance of the reboiler 130 can be stabled, heat can be stably applied to the $CO_2$ absorbing liquid 113 circulating in the regeneration tower 107. This ensures separation of $CO_2$ in the $CO_2$ absorbing liquid.

By the control portion 10, the control valve 12 provided on the vent tube 13 is automatically opened and closed. This eliminates handle operation of the control valve 12 for regulating the pressure of the condensed water drum 5. Accordingly, the time or labor spent by an operator etc. for operating the valve can be lowered.

Second Embodiment

Next, a second embodiment according to the present invention will be explained with reference to FIGS. 2 and 3.

In this embodiment, instead of the vent tube 13 which is the decompression unit of the condensed water drum 5 shown in the first embodiment, the condensed water drum 5 is decompressed by cooling unit that cools the condensed water 6 in the condensed water drum 5. Accordingly, the same components as those in the first embodiment are applied the same reference numerals, and their explanation is omitted.

Figure 2:
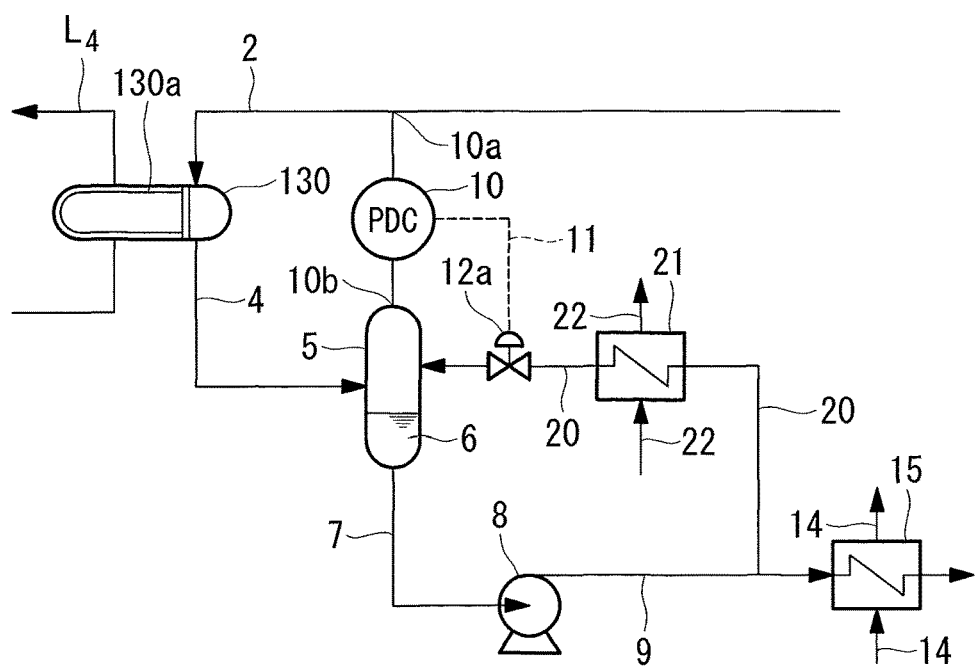
FIG. 2 is a schematic configuration diagram showing a steam supply system regarding a second embodiment according to the present invention.

As shown in FIG. 2, a drain circulation route 20 branched from a steam drain piping 9 that discharges the condensed water 6 from the condensed water drum 5 to return the condensed water 6 to the condensed water drum 5 is provided. This drain circulation route 20 is provided with a cooler 21 (cooling unit) that cools the condensed water 6. The condensed water 6 discharged from the condensed water drum 5 flows in the steam drain piping 9 by the pump 8. Since the drain circulation route 20 that returns the condensed water 6 to the condensed water drum 5 is branched from the steam drain piping 9, a part of the condensed water 6 is indirectly cooled by a cooling medium 22 (for example, rich solution) flowing in a plurality of heat exchanger tubes provided in the cooler 21 when it passes through the cooler 21 to be supplied to the condensed water drum 5.

The cooling medium 22 flowing in the cooler 21 is controlled by the control portion 10. The control portion 10 obtains the pressure difference between the measuring portion 10b that measures the inner pressure of the condensed water drum 5 and the measuring portion 10a that measures the steam pressure to be supplied to the reboiler 130 and controls the control valve 12a such that the obtained pressure difference is a desired value. The control portion 10 transmits a signal 11 to the control valve 12a provided on the drain circulation route 20. In the control valve 12a that received the signal 11, the degree of opening of the control valve 12a is determined based on the pressure difference, and the amount of condensed water 6 cooled by the cooler 21 to be returned to the condensed water drum 5 is controlled.

According to this embodiment, the condensed water 6 flows in the drain circulation route 20 branched from the steam drain piping 9 that discharges the condensed water 6 from the condensed water drum 5, passes through the cooler 21 to be cooled, and is returned to the condensed water drum 5. By returning the condensed water 6 cooled by the cooler 21 to the condensed water drum 5, saturation temperature and saturation pressure can be lowered. This lowers the pressure of the condensed water drum 5.

Figure 3:
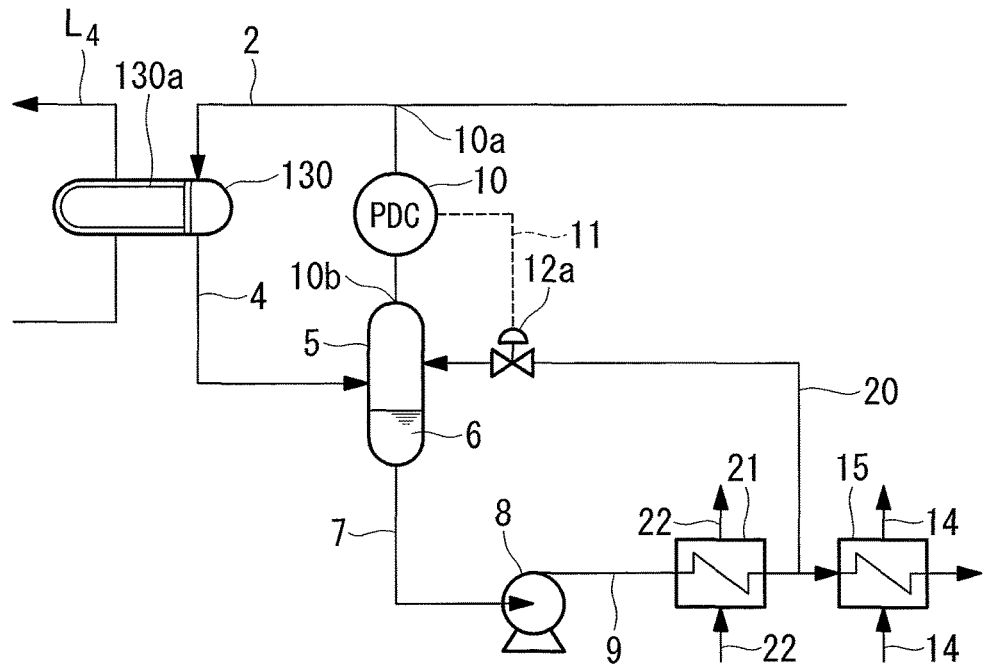
FIG. 3 is a schematic configuration diagram showing a modification of the steam supply system regarding the second embodiment according to the present invention.

FIG. 3 shows a schematic configuration showing a modification of the steam supply system according to the second embodiment of the present invention. As shown in FIG. 3, the cooler 21 provided on the steam drain piping 9 that discharges the condensed water 6 from the condensed water drum 5 and the steam drain circulation route 20 branched from the downstream side of the cooler 21 to return the condensed water 6 to the condensed water drum 5 are provided.

According to the modification of this embodiment, the steam drain circulation route 20 branched from the downstream side of the cooler 21 to return the condensed water 6 to the condensed water drum 5 is provided. Because of this, providing the cooler to the branched circulation route 20 is unnecessary.

Third Embodiment

Next, a third embodiment of the present invention will be explained with reference to FIG. 4.

The present embodiment decompresses the condensed water drum 5 by cooling unit that cools the condensed water 6 in the condensed water drum 5, instead of the decompression unit of condensed water drum 5 shown in the first and second embodiments. Accordingly, the same components as in the first and second embodiments are applied the same reference numerals and their explanation is omitted.

Figure 4:
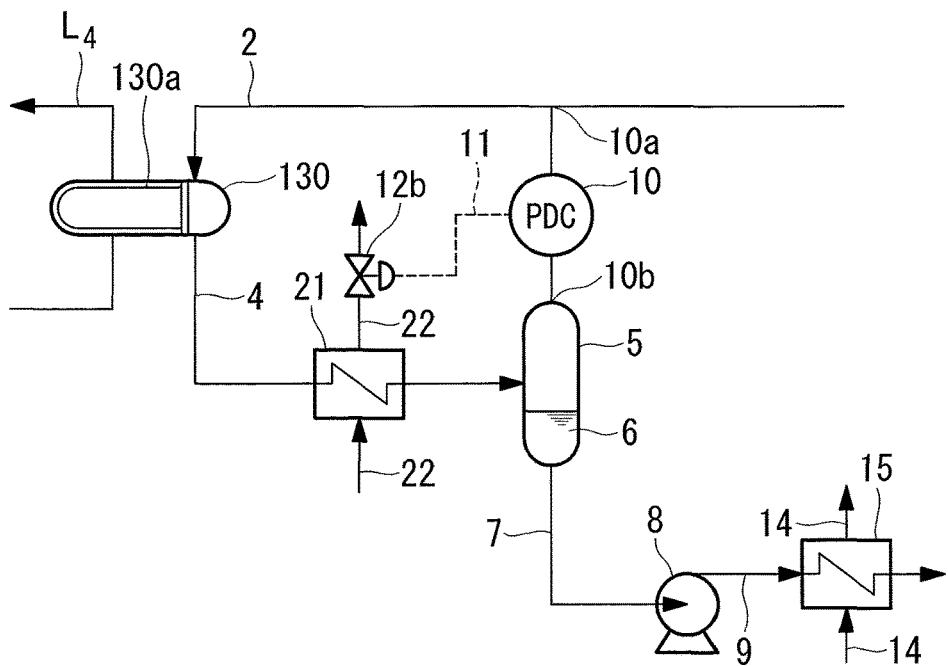
FIG. 4 is a schematic configuration diagram showing a steam supply system regarding a third embodiment of the present invention.
Figure 5:
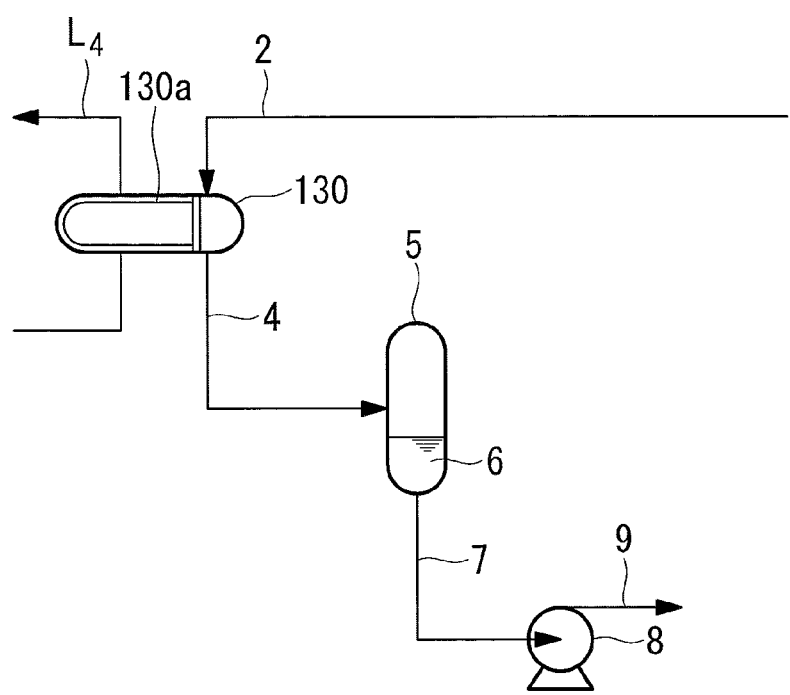
FIG. 5 is a schematic configuration diagram showing a reference example of a steam supply system.

As shown in FIG. 4, the cooler 21 (cooling unit) is provided on an exit piping 4 of the reboiler 130 that connects the reboiler 130 and the condensed water drum 5.

In this embodiment, since the cooler 21 is provided on the exit piping 4, pressure loss is generated in the flow of the exit piping 4.

Fluid in which the steam flowing in the heat exchanger tube 130a of the reboiler 130 and the condensed water 6 are mixed flows in the exit piping 4 to be cooled by the cooler 21 provided on the exit piping 4. The cooled fluid in which the steam and the condensed water 6 are mixed is supplied to the condensed water drum 5.

The cooling medium 22 (for example, rich solution) flowing in the plurality of heat exchanger tubes provided in the cooler 21 is controlled by the control portion 10. The control portion 10 obtains the pressure difference between the measuring portion 10b that measures the inner pressure of the condensed water drum 5 and the measuring portion 10a that measures the steam pressure to be supplied to the reboiler 130, and controls the control valve 12b such that the pressure difference obtained at the measuring portions 10a and 10b is a desired value.

According to this embodiment, the temperature of the condensed water 6 recovered by the condensed water drum 5 can be lowered. To the condensed water drum 5, mixed fluid of the steam cooled by the cooler 21 and the condensed water 6 is supplied. By cooling the condensed water drum 5, saturation temperature and saturation pressure can be lowered. Accordingly, the inner pressure of the condensed water drum 5 can be lowered.

Moreover, while the cooler 21 is provided on the exit piping 4 in this embodiment, not limited to this, it may be provided on the steam drain extraction piping 7. Further, a recycle line may be formed to circulate the condensed water 6 by providing another extraction port separated from the steam drain extraction piping 7 of the condensed water drum 5, and the cooler 21 may be placed on the recycle line.

REFERENCE SIGNS LIST 2 steam supply tube
4 exit piping
5 condensed water drum
6 condensed water
7 steam drain extraction piping
8 pump
9 steam drain piping
10 control portion
10a, b measuring portion
11 signal
12, 12a, 12b control valve
13 vent tube
14 heating medium
15 heater
20 circulation route
21 cooler
22 cooling medium
130 reboiler
130a heat exchanger tube
$L_4$ circulation route

The invention claimed is:

1. A steam supply system comprising:
a reboiler that raises a temperature of absorbing liquid which has contacted with exhaust gas discharged from a boiler to absorb $CO_2$ in the exhaust gas and which has been heated to eliminate $CO_2$,
the reboiler including:
a heat exchanger tube which supplies steam for heating to the reboiler; and
a condensed water drum that recovers condensed water of the steam introduced from the heat exchanger tube as steam drain,
wherein the condensed water drum is provided with a decompression unit that lowers pressure in the condensed water drum,
wherein the decompression unit includes a vent tube that discharges gas phase in the condensed water drum to ambient air, and a flow rate control valve which is provided in the vent tube and which controls flow rate of the gas phase in the vent tube,
the steam supply system further comprising:
a first measuring unit for measuring pressure in the heat exchanger tube at an upstream position of the reboiler;
a second measuring unit for measuring pressure in the condensed water drum; and
a controller which controls the flow rate control valve on the basis of pressure difference between a measured pressure by the first measuring unit and a measured pressure by the second measuring unit,
wherein, when the pressure difference between the pressure measured by the first measuring unit and the pressure measured by the second measuring unit falls below a predetermined value approaching pressure equalization, the flow rate control valve is configured to receive a signal from the controller and configured to change its degree of opening in response to the signal such that the pressure difference is adjusted to a desired value.

2. A steam supply system comprising:
a reboiler that raises a temperature of absorbing liquid which has contacted with exhaust gas discharged from a boiler to absorb $CO_2$ in the exhaust gas and which has been heated to eliminate $CO_2$,
the reboiler including:
a heat exchanger tube which supplies steam for heating to the reboiler; and
a condensed water drum that recovers condensed water of the steam introduced from the heat exchanger tube as steam drain,
wherein the condensed water drum is provided with a cooling unit which cools the condensed water in the condensed water drum in order to lower pressure in the condensed water drum,
wherein the cooling unit includes:
a drain circulation route branched from a steam drain piping that discharges the steam drain from a bottom portion of the condensed water drum, the drain circulation route being connected to the condensed water drum;
a cooler that is provided in the drain circulation route and that cools the steam drain branched to the drain circulation route side, and
a flow rate control valve which controls flow rate of the steam drain in the drain circulation route,
wherein the steam supply system further comprises:
a first measuring unit for measuring pressure in the heat exchanger tube at an upstream position of the reboiler;
a second measuring unit for measuring pressure in the condensed water drum; and
a controller which controls the flow rate control valve on the basis of pressure difference between a measured pressure by the first measuring unit and a measured pressure by the second measuring unit,
wherein the controller controls cooling medium flowing in a heat exchanger tube provided in the cooling unit, wherein, when the pressure difference between the pressure measured by the first measuring unit and the pressure measured by the second measuring unit falls below a predetermined value approaching pressure equalization, the flow rate control valve is configured to receive a signal from the controller and configured to change its degree of opening in response to the signal such that the pressure difference is adjusted to a desired value, and wherein the condensed water cooled by the cooling unit is returned to the condensed water drum through the drain circulation route.

3. A steam supply system comprising:

a reboiler that raises a temperature of absorbing liquid which has contacted with exhaust gas discharged from a boiler to absorb $CO_2$ in the exhaust gas and which has been heated to eliminate $CO_2$, the reboiler including:
  a heat exchanger tube which supplies steam for heating to the reboiler; and
  a condensed water drum that recovers condensed water of the steam introduced from the heat exchanger tube as steam drain, wherein the condensed water drum is provided with a cooling unit which cools the condensed water in the condensed water drum in order to lower pressure in the condensed water drum, wherein the cooling unit comprises:

a cooler provided on a steam drain piping that discharges the steam drain from a bottom portion of the condensed water drum;

a steam drain circulation route branched from the downstream side of the cooler, the steam drain circulation route being connected to the condensed water drum, and a flow rate control valve which controls flow rate of the steam drain in the drain circulation route, wherein the steam supply system further comprises:

a first measuring unit for measuring pressure in the heat exchanger tube at an upstream position of the reboiler;

a second measuring unit for measuring pressure in the condensed water drum; and a controller which controls the flow rate control valve on the basis of pressure difference between a measured pressure by the first measuring unit and a measured pressure by the second measuring unit, wherein the controller controls cooling medium flowing in a heat exchanger tube provided in the cooling unit, wherein, when the pressure difference between the pressure measured by the first measuring unit and the pressure measured by the second measuring unit falls below a predetermined value approaching pressure equalization, the flow rate control valve is configured to receive a signal from the controller and configured to change its degree of opening in response to the signal such that the pressure difference is adjusted to a desired value, and wherein the condensed water cooled by the cooling unit is returned to the condensed water drum through the drain circulation route.

4. A $CO_2$ recovery unit comprising:

an absorbing tower that contacts $CO_2$ in exhaust gas with the absorbing liquid to absorb $CO_2$, and a regeneration tower that discharges $CO_2$ absorbed in the absorbing tower from the absorbing liquid, wherein the regeneration tower includes a reboiler having the steam supply system according to any of claim 1 or 2.

* * * * *